(No Model.) 3 Sheets—Sheet 2.

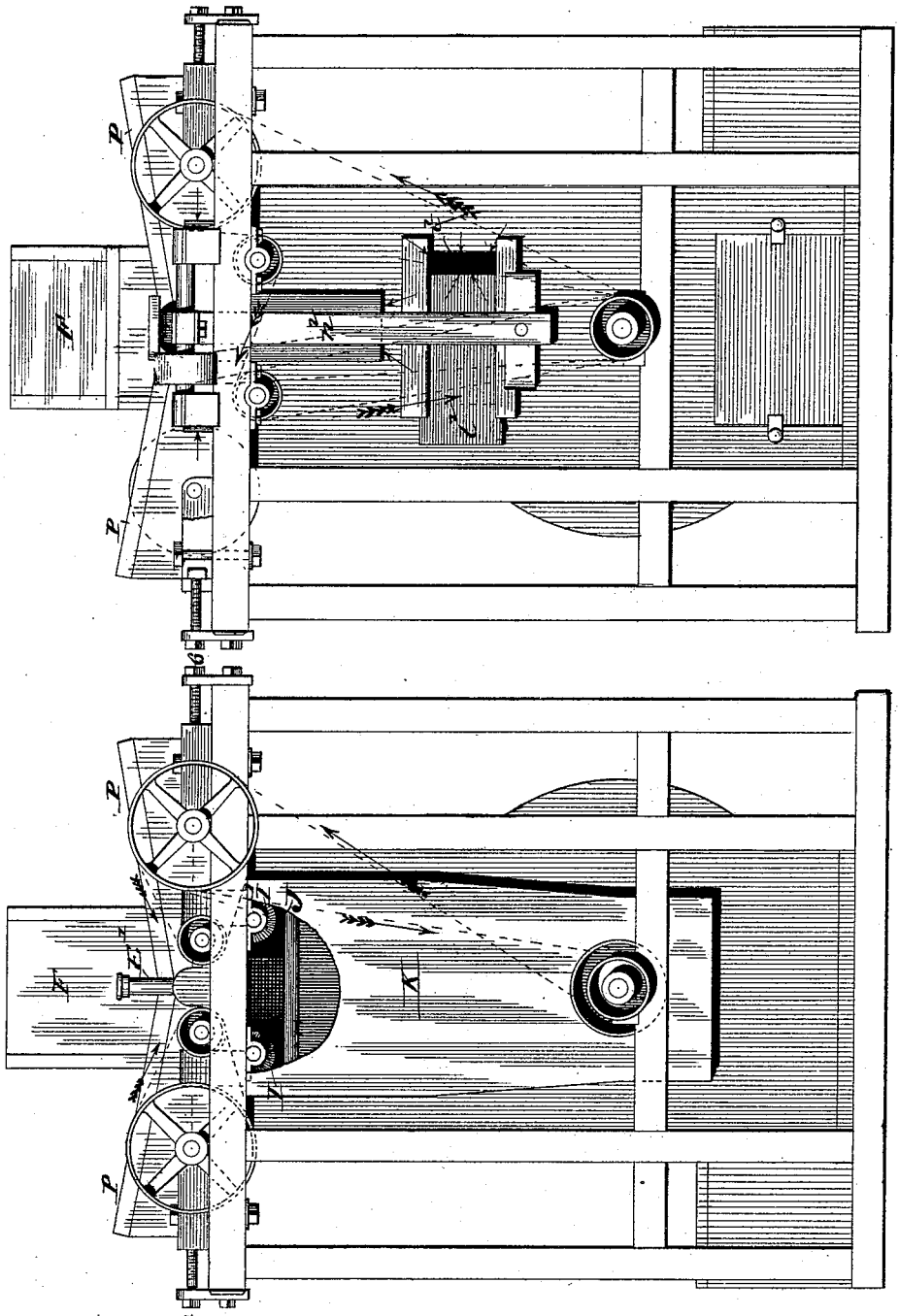

A. J. VANDEGRIFT.
COTTON GIN.

No. 320,901. Patented June 23, 1885.

Attest:
Charles Pickles
J. W. Hoke.

Inventor:
Andrew J. Vandegrift
by C. Duroody
atty

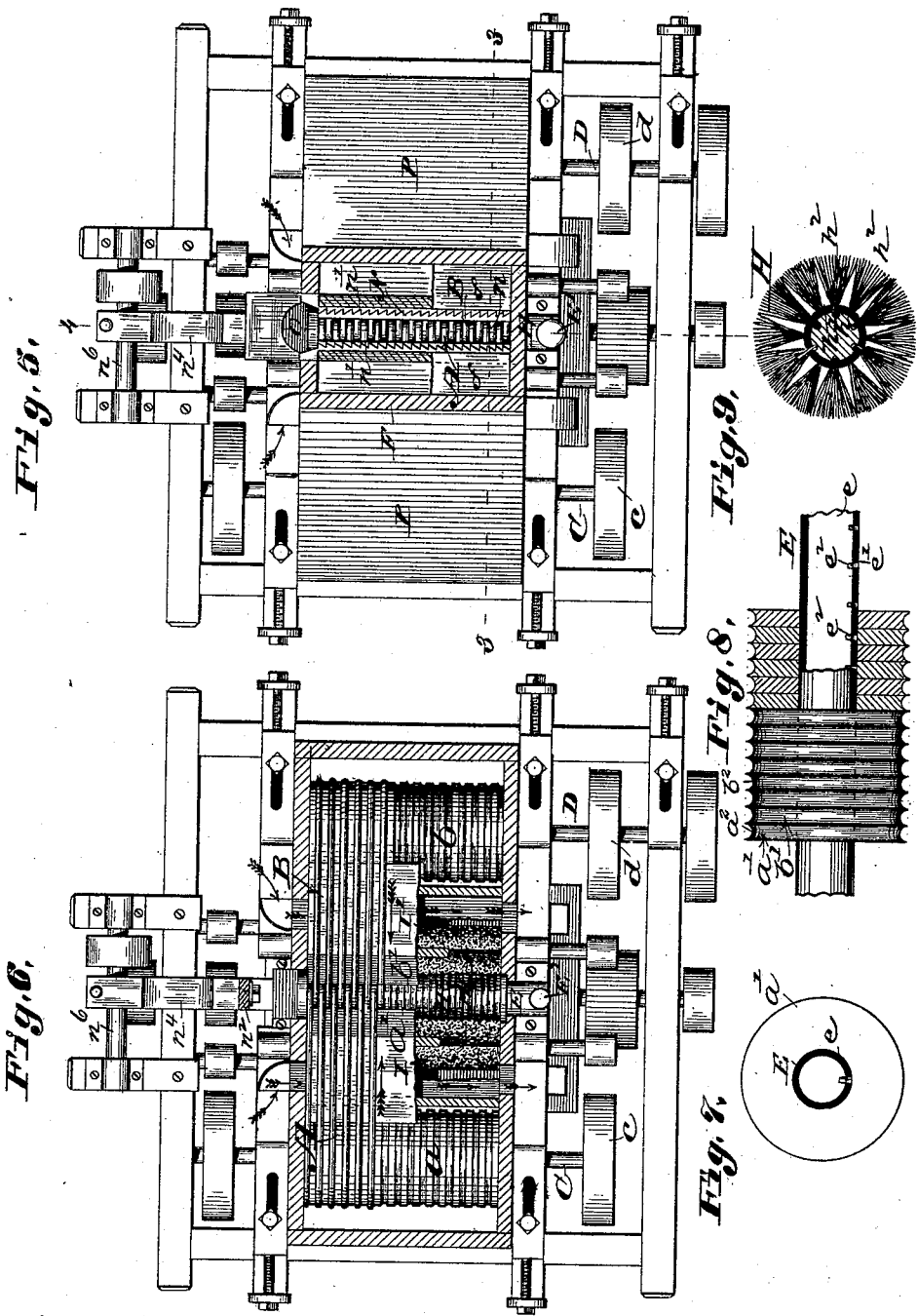

UNITED STATES PATENT OFFICE.

ANDREW J. VANDEGRIFT, OF ST. LOUIS, MISSOURI.

COTTON-GIN.

SPECIFICATION forming part of Letters Patent No. 320,901, dated June 23, 1885.

Application filed September 11, 1884. (No model.)

*To all whom it may concern:*

Be it known that I, ANDREW J. VANDEGRIFT, of St. Louis, Missouri, have made a new and useful Improvement in Cotton-Gins, of which the following is a full, clear, and exact description, reference being had to the annexed drawings, making part of this specification, in which—

Figure 4:
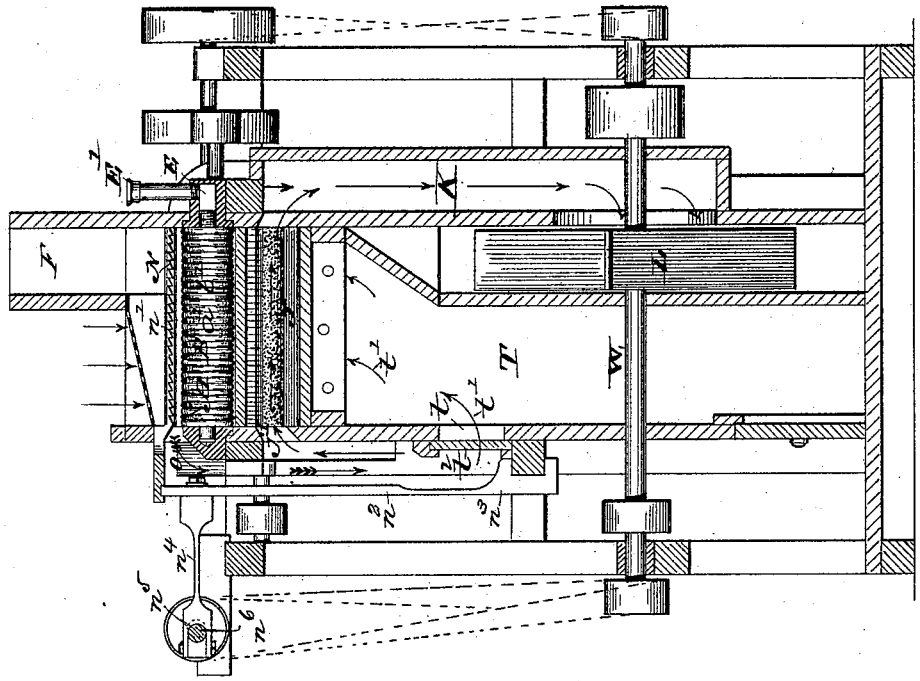
Figure 8:
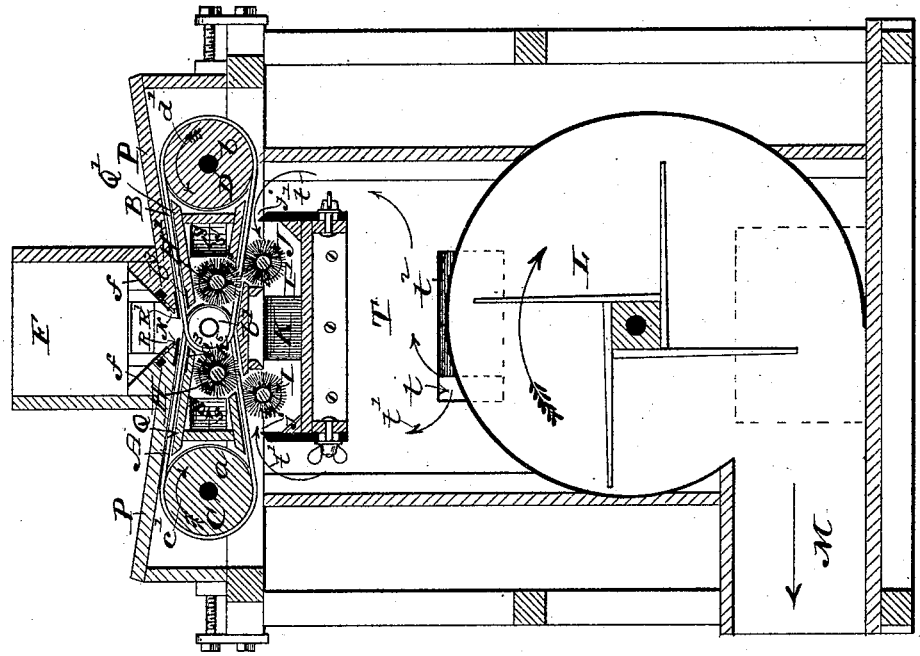

Figure 1 is a side elevation of the improved machine; Fig. 2, a side elevation of the side opposite to that shown in Fig. 1; Fig. 3, a vertical section on the line 3 3 of Fig. 5; Fig. 4, a vertical section on the line 4 4 of Fig. 5; Fig. 5, a plan, the hopper being in horizontal section, and the hopper-bottom being broken away to exhibit the construction beneath; Fig. 6, a horizontal section on the line 6 6 of Fig. 1; Fig. 7, a section of the parts shown in Fig. 8; Fig. 8, a view, partly in elevation and partly in section, of the set of sheaves employed at the center of the machine beneath the hopper to support the inner ends of the two series of belts; and Fig. 9, a cross-section of one of the belt-cleaning brushes.

The same letters of reference denote the same parts.

In the present machine saws are dispensed with, and in lieu thereof a system of belts and sheaves and an air-blast are employed. There are two series of belts, which are driven in opposite directions, and which are arranged, respectively, upon opposite sides of the machine and extend thence to the center. The belts of each series, at their outer ends, pass around and are driven by a drum, and at their inner ends they pass around and drive a corresponding series of sheaves. The sheaves of the two series of belts are alternately arranged and are loose upon a shaft at the center of the machine. The belts, therefore, at their inner ends lap to the extent of the diameter of the sheaves. The cotton to be ginned is placed upon these lapping portions. The air-blast draws downward and past the belts where they pass around the sheaves, and causes the fiber upon the seed-cotton to be drawn downward so as to be caught between the belts and their respective sheaves, and thereby separated from the seed, leaving the denuded seed upon the upper side of the belts. The fiber, so far as it adheres thereto, is removed from the sheaves and belts by means of brushes or other suitable stripping devices, and is, by means of the air-blast, drawn away from the vicinity of the belts and sheaves, and ultimately discharged into a lint-room. The seed, by means of a suitable device, is meanwhile being removed from above the belts in a separate direction and out of the machine.

A A, Figs. 3, 4, 5, 6, represent the belts constituting one of the two series of belts, and B B represent the belts constituting the other series. The belts A, at their outer ends, pass around and are driven by the drum $a$, and at their inner ends they pass around the sheaves $a'$. The belts B similarly pass around the drum $b$ and sheaves $b'$. The drum $a$ is fast upon the shaft C, which is provided with the pulley $c$, and is driven in the direction indicated by the arrow $c'$, Fig. 3. The drum B is fast upon the shaft D, which is provided with the pulley $d$, and is driven in the direction indicated by the arrow $d'$, Fig. 3. The sheaves $a'$ $b'$ are arranged alternately and are loose upon the shaft E, and consequently are rotated thereon according to the movements respectively of the belts A B.

The cotton to be ginned is fed into the hopper F, Figs. 1, 2, 3, 4, 5. The cotton falls upon the inclines $f f$ and the lapping portions of the belts A B, which constitute the bottom of the hopper. As the cotton reaches the belts its fiber is, by means of the air-blast, drawn downward so as to be caught between the belts and the faces of their respective sheaves—that is, by reason of the air-blast setting downward between and past the belts the fiber of such seed-cotton as may be above a belt is sucked downward beneath that belt and caught beneath the belt and the face of its sheave, and, as there are no openings large enough to admit of the seed also being drawn downward, the fiber is stripped from the seed and drawn downward and the seed remains above the belt. The seed-cotton above each belt throughout the two series at the bottom of the hopper is similarly acted upon by the joint action of the air-blast, the belt, and its sheave, the fiber being stripped and drawn downward and the seed being left above the belt. A single belt and its sheave, together with the air-blast, are sufficient for separating a certain amount of fiber from its seed; but the capacity of the machine is increased according to the number of belts used, and by employing two sets of belts, and causing them to travel in opposite directions, as described, the seed-cotton is caused to be moved to and fro above the belts, and the fiber-separating operation thereby facilitated and more effectually performed.

The faces $a^2 b^2$ of the sheaves $a' b'$ are preferably made concave, as shown more distinctly in Fig. 8, and the belts are round. The half-round openings thus provided beneath the belts (these openings are formed substantially by means of the concave faces of the sheaves and the strips $a^3 b^3$, respectively, at each side of the sheaves $a'$ and the sheaves $b'$) facilitate the drawing of the fiber between the belt and its sheave.

On each side of the sheaves $a' b'$, and between the upper and lower portions of the belts, and extending transversely in the machine, are brushes H H', revolving as indicated by the arrows $h^5$, Fig. 3, whose function is to aid in detaching the fiber from the sheaves and belts and cause it to drop between and beneath the lower portions of the belts, at which level another pair of brushes, I I', assists in stripping the fiber from the belts and drawing and urging it still further downward into a chamber, J, Figs. 3, 4, which extends transversely in the machine and communicates with a chute, K, which leads downward in the machine.

The air-section blast used in effecting the downward movement of the fiber past the belts and into and through the chamber J and chute K is generated by suitable means, such as the fan L. This fan is preferably located at the bottom of the chute K. It acts to draw the fiber from the bottom of the hopper downward into the chamber J, and thence into the chute K, and to deliver it through the outlet M, Fig. 3.

The seed, as fast as it is stripped of its fiber, is disposed of, preferably in the following manner. N represents a device, which may be termed a "rake," which is adapted to be moved reciprocatingly in a transverse direction just above the lapping-belts at the bottom of the hopper, and thereby to rake the denuded seed to one side of the hopper and there deliver the seed into a chute, O, through which the seed is discharged from the machine.

The rake is slotted longitudinally at $n$, Fig. 5, to admit of the seed-cotton dropping onto the belts, and the teeth $n' n'$ constitute the sides of the slot, the teeth pointing in the direction in which the seed is to be raked. The reciprocating movement of the rake is effected conveniently, as follows: The rake is attached to the free end of a spring-arm, $n^2$, Fig. 4, whose lower end, $n^3$, is fastened to the frame of the machine, and whose upper end is connected with a pitman, $n^4$, which leads to a cam, $n^5$, on the shaft $n^6$. The rotation of the shaft $n^6$ operates to move the upper end of the spring-arm and the rake to and fro, and the spring-arm serves to keep the rake in place vertically during its horizontal movement. The pitman $n^4$ is made thin at its center, or so that it can bend, in order that it can accommodate itself to the movement of the cam $n^5$.

The hopper does not extend transversely in the machine entirely across the belts, but, as shown in Fig. 4, is extended part way only. The remaining portion of the space above the belts is preferably covered by a plate which acts as a guard to keep the cotton in place above the rake. The plate is perforated to admit of the air being drawn by the action of the fan downward onto the cotton upon the belts, and thence downward through the machine, as above described.

The air is allowed to enter the machine at various points. It not only is drawn downward through the hopper, but it also flows horizontally from both sides of the center of the machine along the upper portion of the belts A B to the immediate vicinity of the sheaves $a' b'$—that is, the upper portion of the belts A B, respectively at each side of the machine, moves beneath the casing P and above the plates Q Q'. This space also constitutes a flue, through which the air is drawn toward the sheaves just in the direction to materially influence the movement of the fiber between the upper portions of the belts and the faces of their respective sheaves—that is, the current drawing along the belts A influences the fiber between those belts and their sheaves, and the current drawing along the belts B influences the fiber between those belts and their sheaves.

The cross-plates $a^3 b^3$ rest, respectively, upon the inner edges of the plates Q Q', and the plates R R' are attached to the casing above the belts and just beneath the rake. All of these plates aid in stripping the cotton from the belts.

Another portion of the air-current is drawn between the upper and lower portions of the belts toward the sheaves, as indicated by the arrows $s s$. This portion of the air-current enters through the openings S S' and it unites with the other portions of the current which draw downward between the belts.

Still another portion of the air-current is drawn into the machine through the opening $t$ in the side of what I term the "mote-box" T. This last-named current passes upward, as indicated by the arrows $t'$, Figs. 3, 4, and through the openings $j j$ into the chamber J. The object of this current is as follows: The brushes I I', which are used to strip the fiber from the lower portions of the belts A B, urge the fiber, together with the motes and whatever foreign matter is liable to be mixed with the fiber, in the direction of the openings $j j$. The air-current, however, entering the chamber, operates to prevent the escape of the lighter fiber from the chamber J, but is not sufficient to arrest the heavier motes and particles of dirt, which pass against the air-current out through the openings $j\,j$ and into the mote-box. It is important to be able to graduate the force of the air-current entering the chamber J through the openings $j\,j$, and this is conveniently done by means of the slide $t^2$, which can be moved to open and close the opening $t$, and thus graduate the amount of the air passing into the mote-box and consequently to the chamber J.

As stated, the sheaves $a'\,b'$ are loose, and they are driven in opposite directions upon the shaft E. They are also arranged closely together upon the shaft. To oil them, thus arranged, the shaft E, Figs. 4, 7, 8, is made hollow, and opposite each sheave the shell $e$ of the shaft is perforated. The oil is introduced into the shaft E by means of the tube E', Fig. 4, and flows longitudinally through the interior of the shaft, and thence outward through the various perforations onto the outer surface of the shaft. The perforations $e'$ are preferably plugged with plugs $e^2$ of some porous material—such as wood—through which the oil can slowly percolate and lubricate the sheaves.

The brushes H I are constructed preferably as shown in Fig. 9. The brush shaft or head is composed of the tube $h$ and a wooden center, $h'$. The shell is perforated to receive the tufts $h^2$, which are drawn into the perforations and secured therein in manner similar to that employed in securing the bristles of an ordinary brush.

The air is admitted into the chamber J also through the inlet $j'$. This inlet is at the opposite end of the chamber from the chute K.

W represents the driving-shaft of the machine. The power is transmitted therefrom by means of suitable pulleys and belts, (indicated by the various dotted lines in Figs. 1, 2, 4,) so as to produce the above-described movements of the belts A B, the brushes H H' I I', the fan L, and the rake N. It is not thought necessary to describe them in detail, as the nature and operations of such parts are readily understood by a reference to the drawings.

I claim—

1. The combination, in a cotton-gin, of the double series of belts A B, the drums $a\,b$, and the sheaves $a'\,b'$, the belts A and the belts B being driven in opposite directions, substantially as described.

2. A cotton-gin having the double series of belts A B, the drums $a\,b$, and sheaves $a'\,b'$, and means for forcing an air-current past said belts and sheaves, the belts A and the belts B being driven in opposite directions, substantially as and for the purpose described.

3. The combination, substantially as described, of the shafts C D E, the drums $a\,b$, the sheaves $a'\,b'$, and the belts A B.

4. The combination, substantially as described, of the shafts C D E, the drums $a\,b$, the sheaves $a'\,b'$, the belts A B, and the hopper F.

5. The combination, substantially as described, of the shafts C D E, the drums $a\,b$, the sheaves $a'\,b'$, the belts A B, the hopper F, and the rake N.

6. A cotton-gin combining in its construction the two series of belts A B and the rake N, the belts A and the belts B being driven in opposite directions, substantially as and for the purpose described.

7. The combination of the hollow shaft E, having the perforated shell $e$ and the porous plugs $e^2$, with the sheaves $a'\,b'$, substantially as described.

8. The combination of the belts A B, the sheaves $a'\,b'$, and the brushes H H', substantially as described.

9. The combination of the belts A B, the sheaves $a'\,b'$, the brushes H H', and the brushes I I', substantially as described.

10. The combination, in a cotton-gin, of the belts A B, the sheaves $a'\,b'$, the chamber J, and means for forcing an air-current past said belts and sheaves into said chamber.

11. The combination of the belts A B, the sheaves $a'\,b'$, and the chamber J, substantially as described.

12. The combination, in a cotton-gin, of a belt and sheave adapted to receive between them the fiber of the cotton being ginned with a chamber into which the fiber after being separated from the seed can be received.

13. The combination of the belts A B, the sheaves $a'\,b'$, the brushes I I', the chamber J, having the openings $j\,j$, and the mote-box T, substantially as described.

14. The combination of the chute K, the fan L, the belts A B, the sheaves $a'\,b'$, and the chamber J, having the opening $j'$, substantially as described.

15. The combination, in a cotton-gin, of the double series of belts A B, the drums $a\,b$, and sheaves $a'\,b'$, a hopper through which the seed-cotton is supplied to said belts and sheaves, means for generating an air-current past said belts and sheaves, and a device for removing the denuded seed from the region of the belts and sheaves, substantially as described and shown.

Witness my hand this 5th September, 1884.

ANDREW J. VANDEGRIFT.

Witnesses:
C. D. MOODY,
J. W. HOKE.